United States Patent [19]

Smid

[11] 4,119,418
[45] Oct. 10, 1978

[54] SYSTEM FOR THE CONTINUOUS SEPARATION OF A GASEOUS MIXTURE

[75] Inventor: Joost Smid, Alkmaar, Netherlands

[73] Assignee: Ultra-Centrifuge Nederland N.V., The Hague, Netherlands

[21] Appl. No.: 744,280

[22] Filed: Nov. 23, 1976

[30] Foreign Application Priority Data

Dec. 19, 1975 [NL] Netherlands ................. 7514822

[51] Int. Cl.² .................................... B01D 53/22
[52] U.S. Cl. ...................................... 55/158
[58] Field of Search .................. 55/16, 66, 158

[56] References Cited

U.S. PATENT DOCUMENTS 2,699,836  1/1955  Barton, Jr. ...................... 55/158
3,208,197  9/1965  Simon et al. .................... 55/16
3,792,570  2/1974  Biondi et al. ................... 55/16

Primary Examiner—Charles N. Hart
Assistant Examiner—Robert H. Spitzer
Attorney, Agent, or Firm—Cushman, Darby & Cushman

[57] ABSTRACT

A system for the continuous separation of a gaseous mixture or a mixture of gaseous isotopes by means of a number of cascade-connected separating units for enriching the mixture (called the rectifier) and a number of cascade-connected separating units for depleting the mixture (called the stripper), so designed that means are provided for transferring separating units temporarily from one stage of the cascade to another stage of the cascade.

2 Claims, 6 Drawing Figures

SYSTEM FOR THE CONTINUOUS SEPARATION OF A GASEOUS MIXTURE

The invention relates to a system for the continuous separation of a gaseous mixture or a mixture of gaseous isotopes by means of a number of cascade-connected separating units for enriching the mixture (called the rectifier) and a number of cascade-connected separating units for depleting the mixture (called the stripper), which separating units are each provided with a feed connection for the mixture to be separated and two connections for the separate discharge of the separated components of this mixture.

Such a system is known, for example, from the NUCLEAR ENGINEERING HANDBOOK by H. Etherington, McGraw-Hill Book Company Inc., 1958, Chapter 14, page 39, FIG. 2.

Separating units as here intended refer to a system which is independently capable of enriching and/or depleting a mixture of the composition indicated. The various systems which can be used for this purpose are described, e.g. in the article by Ir. F.E.T. Kelling: "Methoden voor uranium-verrijking" (Methods of uranium enrichment) in the journal *Atoomenergie en haar toepassingen* (Atomic Energy and Its Applications), December 1972, pages 297–312. This article indicates that a separating unit can be composed of a diffusion cell, a thermodiffusion cell, etc., etc..

In the present patent application, a separating unit is also understood to constitute a group of such cells.

Such enrichment plants can be used, among other things, for the enrichment of uranium compounds. Now it has been found in practice that the various clients of enrichment plants require a variety of degrees of uranium enrichment. Depending on the type of reactor for which the enriched uranium is intended and on the construction of the reactor core, uranium compounds are required which have a degree of enrichment which may vary from approx. 1.5 percent to approx. 4 percent.

The enrichment cascades hitherto known had the drawback that, when supplying product having product concentrations varying from the optimum value, the cascade gas flows no longer corresponded to those of the ideal cascade form. Various stages then received stage flows which were too high, others being offered stage flows which were too low, so that the separating elements yielded a reduced separating output. In order to meet this drawback, the system according to the invention is so designed that means are provided for transferring separating units temporarily from one stage of the cascade to another stage of the cascade. The invention aims specifically at transferring separating units at the top or near the top of the enrichment cascade to a lower area of the overall cascade, or, conversely, at transferring separating units from the stripper to a higher area of the cascade.

A lower area here indicates at least the part which in the above has been referred to as the stripper. However, it can also be necessary to transfer at least part of the aforementioned separating units temporarily to the lowest step of the enrichment cascade (i.e., to the bottom of the rectifier).

This transfer of a number of separating units can take place in two manners.

In the first place, this transfer can be performed schematically, meaning that these separating units retain their geographic position but are only included in another part of the cascade arrangement by temporarily modifying the pipe-line connections. This can best be done by connecting reversible, branched connecting pipe-lines to each separating unit, in such a way that, by closing a closing element in each branch and by opening a closing element in another branch, the separating unit no longer cooperates with the original part of the cascade, but with another part of the overall cascade.

Another method consists in temporarily uncoupling certain separating units from the cascade and then geographically conveying them to another area in the enrichment plant, where they are again connected to the cascade, in such a way that they now serve in the aforementioned part of the overall cascade.

The flexibility of the cascade can be substantially increased by making the feed point reversible as well. It is furthermore possible to include pipe-lines or a pipe system in the cascade for the purpose of implementing any required reversals with the aid of the available system of piping so that there is no need to make extensive changes in the cascade.

The principle of the patent application will be explained in further detail on the basis of six figures. In these figures, FIG. 1 shows a so-called ideal cascade form.

Figures 1, 2:
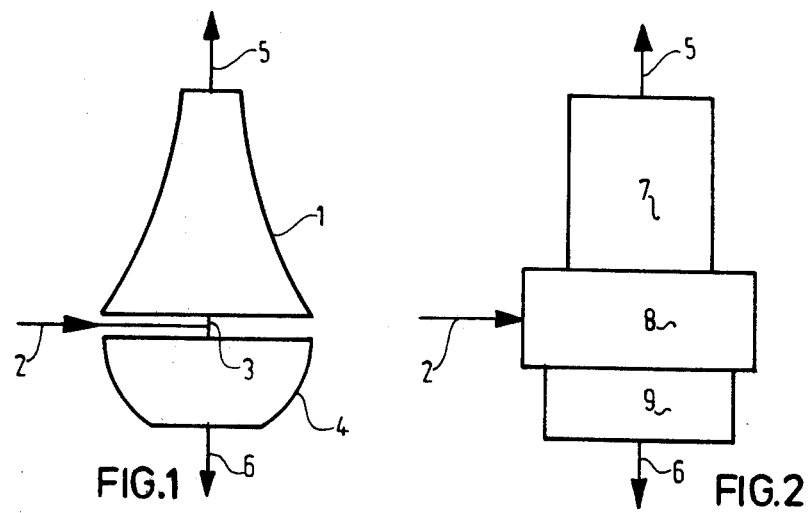
FIG. 2 is a cascade consisting of three straightened parts.

The ideal cascade shown in FIG. 1 has at its upper end a rectifier 1 which is tapered in form. The gaseous mixture which is to be separated is supplied through pipe-line 2 to the overall cascade, which flow is branched at 3 in such a way that a part can flow upwards into the rectifier, while another part can flow downwards into the stripper 4.

The enriched product is discharged at 5, the waste product, or waste, being removed through the pipe-line 6. As explained by Ir. F.E.T. Kelling in his article cited hereinabove, the width of a cascade is determined by the desired production in kilograms per second. Since all separating elements in a cascade will have to be supplied with approximately equal amounts of mixture, the width will also determine the number of separating units that are arranged in parallel. In an ideal cascade, therefore, each stage will comprise different numbers of elements. The ideal cascade form is approached in practice by arranging a limited number of straightened cascade parts in series. FIG. 2 shows this arrangement in a very simple form which comprises three straightened areas, i.e., parts 7, 8 and 9.

Figure 3:
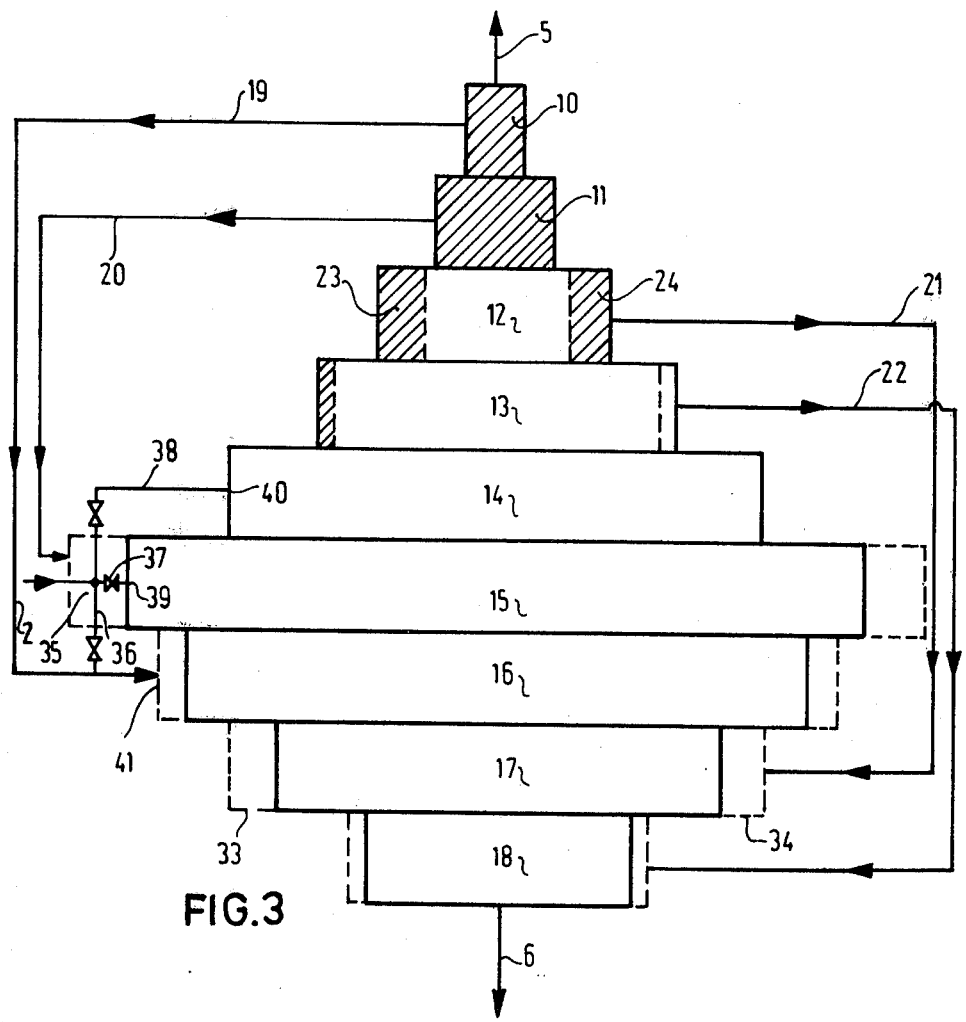
FIG. 3 is a cascade composed of nine straightened parts, of which parts from the rectifier are changed over to the stripper.

A much more extensive division is found to be necessary in practice, so that a cascade structure may have, for instance, the shape which is shown schematically in FIG. 3. This overall cascade consists of the straightened parts 10 through 18, which numbers relate to the rectangles situated inside the solid lines.

FIG. 3 shows the original situation inside the solid lines of the cascade.

In changing over to the reversed situation, it is sufficient for the separating units of stage 10 to be transferred to stage 16 (see line 19, which indicates this displacement schematically), while the separating units of stage 11 are transferred in the same manner through line 20 to stage 15, The displaced separating units are shown with interrupted lines in steps 15 and 16. The same takes place analogously with the shaped parts of stages 12 and 13, which are transferred to stages 17 and 18, respectively, with the aid of the transfer lines 21 and 22.

After this "displacement" of these separating units, the overall cascade has received a shape which has been left blank and which is bounded in the lower part of the overall cascade by interrupted lines. It is clearly seen from FIG. 3 that it is only necessary to displace a small part of the separating units, and that the greater part of the cascade can be left unaffected.

As has already been noted in the above, the lines 19, 20, 21 and 22 can be conceived in two manners, i.e., as an indication how the separating units must be additionally switched on to the indicated point of the cascade, or as displacement lines which indicate how the separating units must be temporarily conveyed geographically to a lower area of the overall cascade.

The feed pipe-line 2 is branched at 35 into three pipe-lines 36, 37 and 38 which comprise stop valves. By opening one of these valves, the feed point can be shifted at will from 39 to 40 or 41.

It should be noted that the cascade is drawn symmetrically for the sake of clarity. This means that the cascade parts 23 and 24 belong together, and are displaced jointly along the displacement line 21 to the cascade stage 17, which is extended by the cascade parts 33 and 34, in such a way that 23 is equal in size to 33, and 24 to 34. The same applies analogously to the other separating units which are to be displaced.

Figure 4:
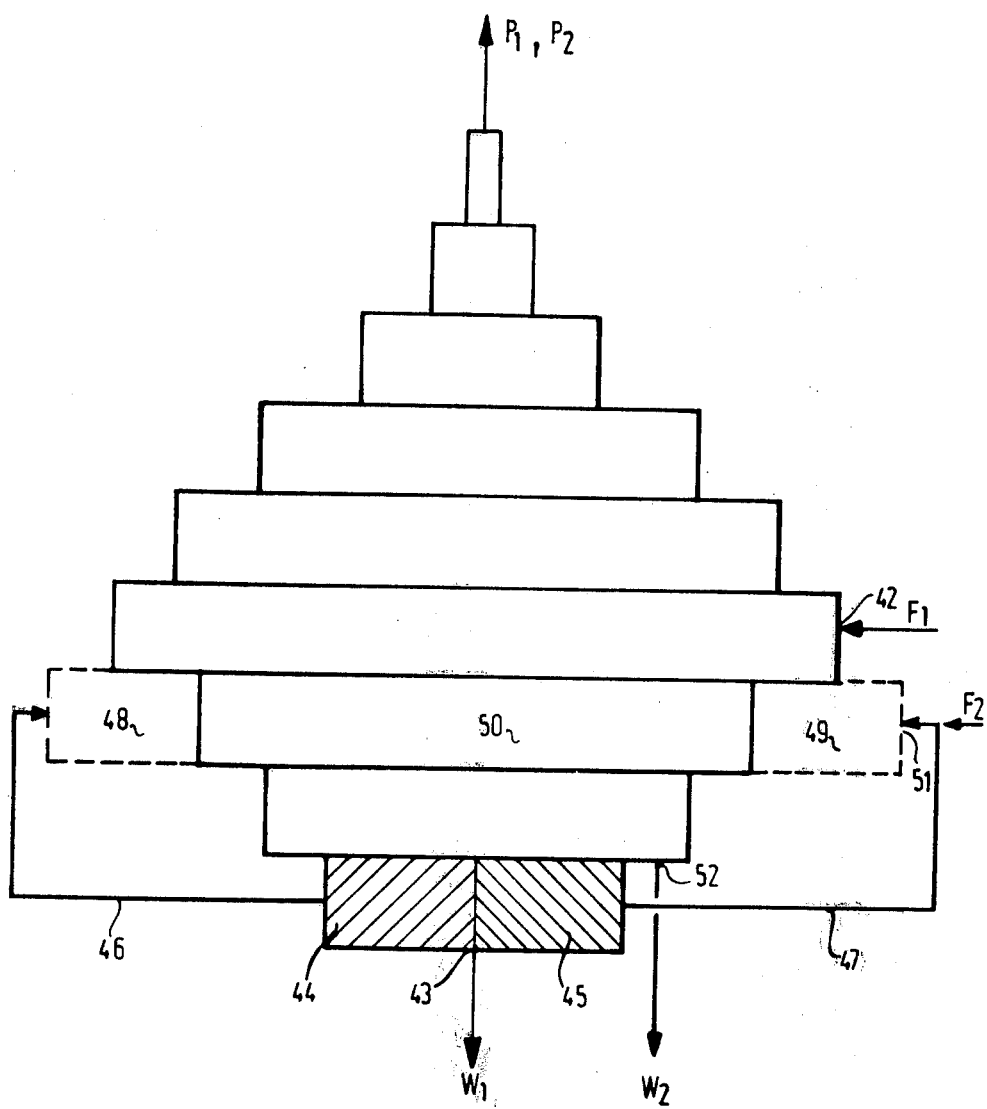
FIG. 4 is a similar cascade, of which a part from the stripper is changed over to the rectifier.

FIG. 4 shows a similar cascade, the original shape being indicated by the solid contours. Feeding here takes place at feed point 42, identified as $F_1$. The waste is drained at 43. The product is $P_1$.

Figure 5:
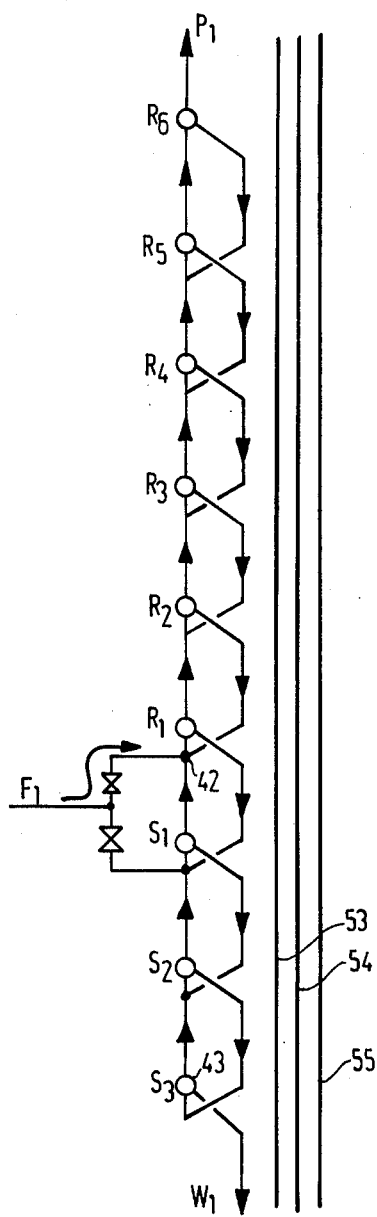
FIG. 5 is a simplified piping diagram of the cascade according to FIG. 4 before the reversal.
Figure 6:
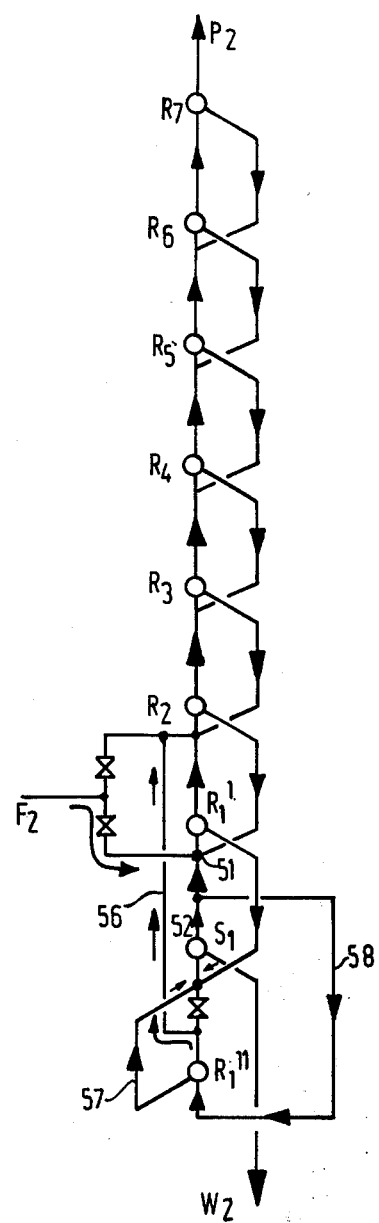
FIG. 6 is a similar diagram after the reversal.

By performing a change-over operation, the stripper parts 44 and 45 are then reversed along the displacement lines 46 and 47 to the places 48 and 49 of the rectifier step 50. At the same time, the feed $F_2$ is shifted to the supply point 51. In FIGS. 4, 5 and 6 $P_1$ and $P_2$ indicate product outflow and $W_1$ and $W_2$ indicate waste outflow. In FIG. 4 the waste $W_2$ is drained at 52.

In FIG. 5, the cascade of FIG. 4 is drawn in a slightly different manner, with six rectifier steps $R_1$-$R_6$ and three stripper steps $S_1$-$S_3$.

After the change-over, the situation is as shown in FIG. 6. There are now seven rectifier stages $R_1$-$R_7$, of which $R_1$ is divided into two parallel parts $R_1^I$ and $R_1^{II}$, while there is now only one stripper stage $S_1$ left.

In FIG. 5, the numbers 53, 54 and 55 indicate change-over pipe-lines provided with stop valves and connecting points (not shown). These pipe-lines furthermore are so designed that part of pipe-line 53 can be used for the connection 56 in FIG. 6. Similarly, pipe-line 54 can be used for 57, and pipe-line 55 for 58. Those parts of the pipe-lines 53, 54 and 55 which are not used are sealed with respect to the used parts by means of blind flanges or stop valves.

I claim:

1. Cascade apparatus for the continuous separation of a gaseous mixture or a mixture of gaseous isotopes comprising an enriching cascade including a number of cascade-interconnected separating units for enriching the mixture and a depleting cascade including a number of cascade-connected separating units for depleting the mixture, which separating units are each provided with a feed connection for the mixture to be separated and two connections for the separate discharge of the separated components of the mixture, the cascade apparatus being supplied with mixture to be separated through a feed pipe-line which opens at a main feed point into a connecting pipe-line between the enriching and the depleting cascade, the top of the enriching cascade being connected to a discharge pipe-line, and the bottom of the depleting cascade being connected to a discharge pipe-line for depleted mixture, means for the temporary transfer of separating units from one stage of the cascade to another stage of the overall cascade, said means including branched connecting pipe-lines provided with closing elements, which closing elements permit the change-over of the respective separating unit as a result of closing element in one branch and of opening the closing element in the other branch, said cascade apparatus comprising at least one triple reversing pipe-line equipped with connecting points and closing elements for allowing the separating units to be included in a modified cascade structure according to a programmed change-over pattern.

2. Apparatus for uranium isotopic enrichment by gaseous separation comprising a set of elemental stages of gas separation which are cascade-interconnected in such a way as to supply, from its two ends quantities of enriched and depleted gas, according to claim 1, wherein said feed pipe-line is branched into a plurality of sub-feed lines, entering the cascade apparatus partly in the enriching cascade near the main feed point, and partly in the depleting cascade near the main feed point, the subfeed lines being provided with closing valves whereby the actual feed point of the cascade apparatus is capable of being changed over.

* * * * *